United States Patent [19]

Trinca

[11] 3,793,591

[45] Feb. 19, 1974

[54] PULSE GENERATOR

[75] Inventor: Celio C. Trinca, Bregnano, Italy

[73] Assignee: Honeywell Information Systems Italia, Caluso, Italy

[22] Filed: July 13, 1972

[21] Appl. No.: 271,430

[30] Foreign Application Priority Data

Aug. 3, 1971 Italy .............................. 27091-A/71

[52] U.S. Cl. .................... 328/34, 307/208, 307/215

[51] Int. Cl. ............................................ H03k 5/08

[58] Field of Search ... 307/205, 208, 218, 215, 257, 307/279, 304; 328/34

[56] References Cited

UNITED STATES PATENTS

| | | | |
|---|---|---|---|
| 3,571,729 | 3/1971 | Honma | 307/218 |
| 3,075,089 | 1/1963 | Maley | 328/55 |
| 3,283,255 | 11/1966 | Cogar | 307/218 |
| 3,510,787 | 5/1970 | Pound | 307/205 |
| 3,582,674 | 6/1971 | Pound | 307/205 |
| 3,660,675 | 5/1972 | Andrews | 307/215 |
| 3,668,423 | 6/1972 | Couch | 307/208 |
| 3,219,845 | 11/1965 | Nieh | 307/218 |
| 3,229,119 | 1/1966 | Bohn | 307/208 |

*Primary Examiner*—Rudolph V. Rolinec
*Assistant Examiner*—R. E. Hart
*Attorney, Agent, or Firm*—Fred Jacob

[57] ABSTRACT

A circuit is provided comprising of a minimum number of components which may operate as a pulse generator or a square wave generator by changing a single connection.

The circuit includes an integrated circuit unit having a pair of NAND or NOR gates. A delay line has an input terminal connected to an output lead of one of the gates and an output terminal connected to one input lead of the other gate. A command signal is applied to one input lead of the first gate and to a second input lead of the other gate. The second input lead of the one gate is connected either to a suitable external voltage source for generating a single square pulse in response to a command signal or to the output terminal of the delay line for generating a succession of square pulses in response to the command signal. The circuit may also include a third gate having an output lead connected to the first input lead of the one gate, a first input lead connected to receive the command signal, and a second input lead connected to an output lead from the second gate, which output terminal serves as the output terminal of the circuit.

6 Claims, 9 Drawing Figures

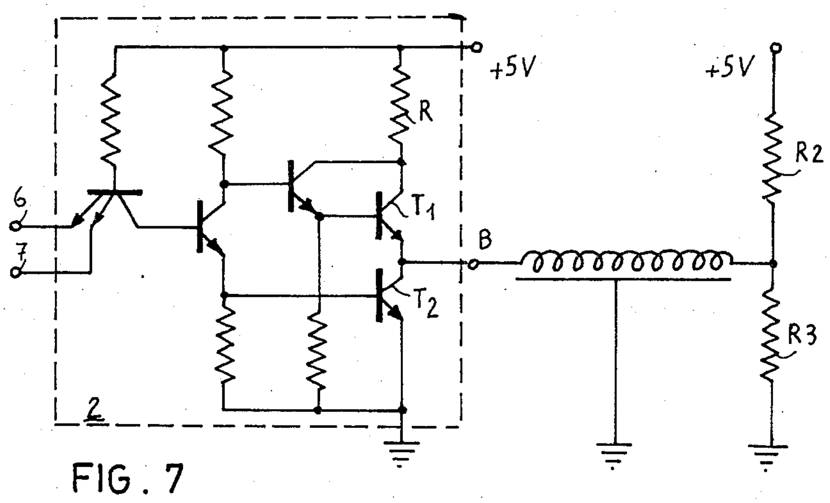
FIG. 7
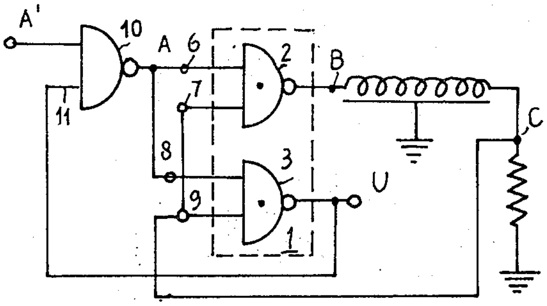
FIG. 6
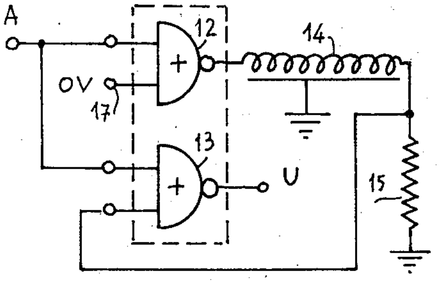
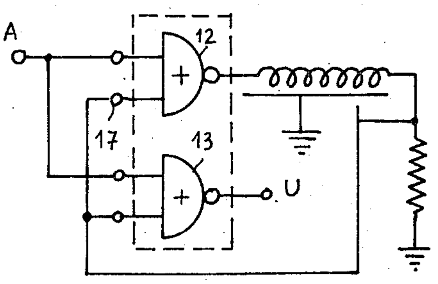
FIG. 8 FIG. 9

PULSE GENERATOR

BACKGROUND OF THE INVENTION

The present invention relates to a pulse generator, built up from a minimum number of components, which may operate either as generator of individual square pulses, having well defined amplitude and length, or as a continuous generator of square waves of well defined amplitude and period.

The difference in operation is obtained by changing a single connection.

It is well known that in modern electronic apparatus used for digital data processing, the electronic units providing the different required functions tend to be standardized in construction and minimized in number, in order to reduce the purchasing and stock management expenses, to improve servicing by using a limited number of spare parts, and also for making it possible to define a simple set of application rules for making the task of designing electronic equipment easier through the use of such units.

It is also well known that modern electronic equipment uses, in combination, a large number of timing circuits for generating, under suitable control signals, either individual pulses of well defined amplitude and length or continuous square waves of a well defined period.

Therefore, the design of a simple circuit capable of operating either as a square pulse generator, or as a square wave oscillator, without changing component parts, but only by simply changing connections, provides the above named advantages.

SUMMARY OF THE INVENTION

An object of the present invention is therefore to provide one such circuit, which offers unique characteristics of constructive simplicity and timing precision in addition to the above-indicated versatility of use.

The circuit according to the invention comprises two NAND or NOR logic units of the same type, preferably in integrated form, a delay line preferably with distributed constants, and a terminal matching impedance for the delay line.

BRIEF DESCRIPTION OF THE DRAWINGS

The constructive details of the circuit according to the invention, as well as its advantages and characteristics, will appear clearly from the following detailed description, and from the attached drawings, in which:

FIG. 6 shows an alternate embodiment of the circuit of FIG. 3;

FIG. 7 illustrates the electrical wiring diagram of a binary gate being part of the circuit according to the invention, and a preferred form of matched impedance for the delay line;

FIG. 8 schematically illustrates a pulse generator circuit according to the invention using NOR gates; and FIG. 9 schematically illustrates an oscillator circuit according to the invention using NOR gates.

DESCRIPTION OF THE PREFERRED EMBODIMENT

Figure 1:
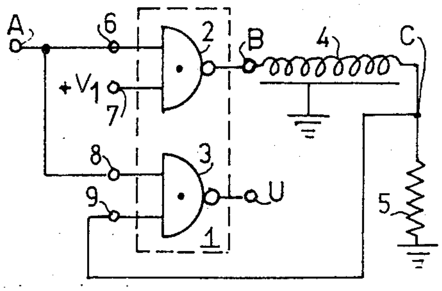
FIG. 1 is a block diagram of a pulse generator circuit according to the invention.

Referring now to FIG. 1, the circuit comprises a first NAND gate 2 having at least two inputs, a second NAND gate 3 also having at least two inputs, an electromagnetic delay line 4 and a matching impedance 5 at one end of the delay line.

The NAND gates 2 and 3 are preferably fabricated as an integrated circuit. A commercially available type of intergrated circuit which has proved to be fully suitable for the purpose is one marketed by Texas Instruments Co. under code number 74H40. This circuit belongs to the family known as TTL (Transistor-Transistor-Logic), comprises two NAND gates having four inputs each, and is characterized by a low output impedance (of the order of 10 ohms), by the ability to supply output currents of the order of 50 mA, and by a very short switching time, lower than 20 nanoseconds. As two inputs are sufficient for the purposes of the present invention, the four inputs may be connected in parallel by pairs, or alternatively, the two excess inputs may be connected to a suitable voltage source.

Referring to FIG. 1, a first end of the delay line 4, that is, the input end, is connected to the output terminal B of the NAND gate 2. The other end of the delay line is connected to a junction C to which the matching impedance 5, having a value substantially equal to the characteristic impedance of the delay line, and the input terminal 9 of the NAND gate 3, are connected.

The input terminals 6 and 8, respectively of NAND gate 2 and NAND gate 3 are connected to an input control terminal A.

In the example shown in FIG. 1, the input terminal 7 is connected to a voltage source $+V_1$, for instance +5V, corresponding to a binary level ONE.

Figure 2:
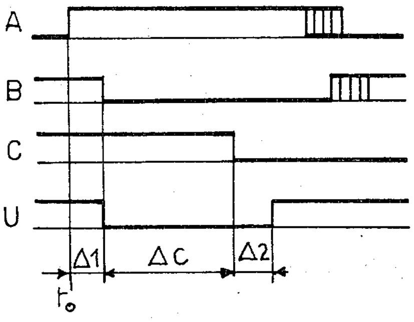
FIG. 2 is a time diagram showing the binary levels of the signals at various points of the circuit of FIG. 1.

The operation of the illustrated circuit is now described with reference to FIG. 2, representing a time diagram of the binary level of the electrical signals present at different times at several points in the circuit, as indicated by the capital letters.

At rest, terminal A is kept to a binary level ZERO. Therefore, the output B of NAND gate 2 and the output U of NAND gate 3 are at binary level ONE, independently of the level of the remaining inputs 7 and 9.

Also, the output C of the delay line is, in the rest conditions, at the same binary level ONE as B.

If at a predetermined instant $t_0$, a binary level ONE is applied to the control input terminal A, a ONE level being applied both to input 7 of NAND gate 2 and input 9 of NAND gate 3, both output terminals B and U of NAND gates 2 and 3 go to binary level ZERO after a delay $\Delta$ 1, which depends on the switching time from ONE to ZERO of the said gates.

It may be remarked that as the NAND gates are part of the same integrated unit, this delay is substantially the same for both gates, even if some difference may be found between different integrated units. Therefore, the output terminals B and U go to level ZERO at the same time.

The switching from ONE to ZERO of output B cause a falling voltage front to propogate along the delay line; this front reaches the end C of the line after a time Δ C which is characteristic of the line.

As the voltage front reaches the end c of the delay line, the binary level applied to input 9 of NAND gate 3 goes from ONE to ZERO. Therefore, the output terminal U returns to level ONE after a delay Δ 2 which depends on the switching time from ZERO to ONE of the NAND gate 3.

The output U, therefore supplies a level ZERO pulse of duration $\Delta C + \Delta 2$.

As the characteristic propogation time of an electromagnetic delay line does not change appreciably with time and temperature, and may be defined with high precision, the only factor which may affect the length of the pulses supplied by the circuit is the switching time of the gate 3. On the other hand the switching time $\Delta_1$, from ZERO to ONE, of the NAND gates 2 and 3 does not affect the duration of the pulse. Therefore, the precision and the stability of a pulse generator as herein described are very high and makes it especially suitable for supplying very short pulses, of the order of few tens of nanoseconds.

In addition to these particular precision and stability characteristics of such a circuit, there is the further advantage that it may be made to supply a succession of square waves, by simply modifying the internal connections.

Figure 3:
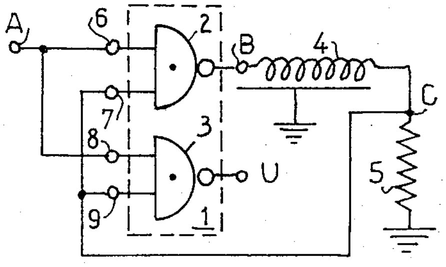
FIG. 3 is a block diagram of an oscillator circuit according to the invention.

Consider now the circuit illustrated by the block diagram of FIG. 3. This circuit comprises the same components as that of FIG. 1, with the only difference being that the input terminal 7 of NAND gate 2 is connected to the junction C, that is to the end terminal of the delay line, instead of being kept at a constant voltage +V1 corresponding to binary level ONE. By a change in this connection, the circuit is transformed to a generator of square waves having very high stability and precision.

Figure 4:
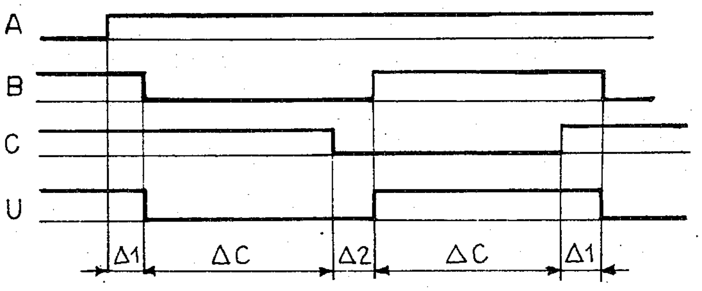
FIG. 4 is a time diagram showing the binary levels of the signals at various points of the circuit of FIG. 3.

The operation of the circuit is illustrated with reference to FIG. 4, which shows the time diagram of the binary levels of electrical signals present at different times at several points in the circuit, as indicated by the capital letters.

In the rest condition, a signal of binary level ZERO is applied to the terminal A. Therefore, output B of NAND gate 2 and output U of NAND gate 3 are at binary level ONE independently of the signals applied at inputs 7 and 9 respectively. Output C of the delay line is at the same level ONE as terminal B, and so are inputs 7 and 9 of the NAND gates 2 and 3.

If at an instant t a signal of binary level ONE is applied at terminal A, a binary level ONE being applied at both inputs 7 of NAND gates 2 and 9 of NAND gate 3, both outputs B and C of the NAND gates go to a binary level ZERO after a delay Δ 1 equal to the ONE-to-ZERO switching time of the gates.

The switching from ONE to ZERO level of the output B causes a falling voltage front to propagate along the delay line. This front reaches the end terminal C of the line after a delay Δ *c* which is characteristic of the line. At this time, the binary levels present at input 9 of NAND gate 3 and at input 7 of NAND gate 2 go from ONE to ZERO and consequently both output terminals B and U go to binary level ONE after a delay Δ 2 equal to the ZERO to ONE switching time of the NAND gates.

A rising front therefore propagates along the delay line, so that after a delay Δ *c* the point C returns to binary level ONE. Correspondingly, both inputs 7 and 9 of the NAND gates are brought to binary level ONE, and therefore the output terminals B and U return to the binary level ZERO after a delay $\Delta_1$ equal to the ONE to ZERO switching time of the gates 2 and 3.

It will be observed that, as long as a control signal of a binary level ONE is applied to terminal A, the periodic operation of the circuit is sustained, and a succession of square waves of a period equal to $2\Delta C + \Delta 1 + \Delta 2$ is supplied by output U. As the switching times Δ1 and Δ2 are substantially of the same value, the degree of precision and stability of such an oscillator is the same as that of the pulse generator previously described.

It must be remarked that, for the pulse generator as well as for the oscillator, the control signal applied to terminal A should be maintained for the whole duration, respectively, of the zero pulse, and of the negative half-waves. If this is not the case, the ZERO pulse supplied or the last negative half-wave are cut off and made shorter than the above-specified duration.

In general, this fact may not be relevant. However, it may be shown that a modification of the circuit may be carried out in order to avoid this occurrence.

Figure 5:
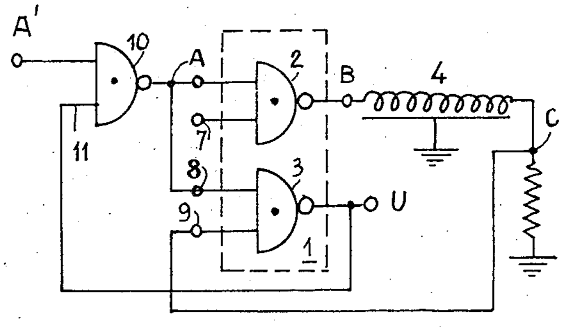
FIG. 5 shows an alternate embodiment of the circuit of FIG. 1.

This modification is illustrated in FIG. 5 and FIG. 6 respectively. In both cases it consists of controlling the input terminal A in an indirect way, by means of an additional NAND gate 10, having two inputs. One of the inputs which is connected to the input terminal 11 receives a signal from the output U and the other one corresponds to the control terminal A', which must be of an inverted level with respect to the one formerly used.

It may easily be seen that the application of a level ZERO signal to terminal A' causes a level ONE signal to be applied to terminal A after a delay Δ3 equal to the switching time of NAND gate 10, and that such a signal causes the operation of the circuits as formerly described. As a consequence, the terminal 11 receives a level one signal, after a delay $\Delta_1 + \Delta_3$ with respect to the signal applied to the terminal A'. Therefore, after this delay time the signal applied to A' may be removed without the operation of the pulse generator of FIG. 5 or respectively of the oscillator of FIG. 6, being interrupted. Interruption of the operation will take place only when the output U returns to a binary level ONE, that is, at the end of the pulse, or respectively of the negative half-wave.

In the schematic representation of the circuits as thus far shown and described, the delay line is terminated by a matching impedance 5 connected to the ground. However, the termination of the line may also be provided in a different manner, for instance by connecting the end of the line to a voltage generator, having the same impedance as the characteristic impedance of the line, and a voltage approximately equal to level ONE voltage.

This change may be useful in reducing the power dissipated by the gate 2. FIG. 7 shows the effective wiring diagram of a NAND gate, in this case NAND gate 2, according to the TTL technique. Minor differences in the construction and connection details, as may occur in integrated units fabricated by different producers, do not substantially change the operation of the circuit.

It may be seen that, applying a voltage corresponding to binary level ONE to the inputs 6 and 7, the transistor T2 is conducting and transistor T1 is interrupted. Reciprocally, if at least one of the inputs 6 or 7 is at binary level ZERO, transistor $T_1$ is conducting, and transistor $T_2$ is interrupted. When $T_1$ is conducting, the binary level of the output is ONE, and the feeding voltage +5V is applied to the output terminal B through resistor R and transistor $T_1$. On the other hand, when $T_2$ is conducting, the binary level of the output is ZERO, and the terminal B is connected to ground through the transistor $T_2$.

If the end terminal C of the line were connected to ground only by means of the matching impedance 5, as shown in FIGS. 1, 3, 5 and 6, in the rest condition a current would flow through the resistor R, transistor $T_1$, the delay line and the matching impedance. The power dissipated in resistor R, which is part of the integrated unit could be the cuase of intolerable overheating of the same.

To avoid this, the end terminal C of the delay line is connected to both the voltage source +5V through a resistor $R_2$ and to ground through a resistor $R_3$, as shown in FIG. 7. The values of $R_2$ and $R_3$ are so chosen that the end of the delay line C is connected to an equivalent voltage generator having a voltage not much lower than +5V and an impedance sufficiently close to the characteristic impedance of the line. As a result, in the rest condition, the current flowing from terminal B through the line is very small, and the power consumption resulting is reduced to a tolerable value.

On the oter hand, when the pulse generator is operating, and transistor $T_2$ is conducting, a current is flowing through the delay line and transistor $T_2$ to ground. The resultant power dissipation in transistor $T_2$ is acceptable because the voltage drop across the collector and emitter of transistor $T_2$, when saturated, is very small, the greatest part of the power being dissipated outside the integrated unit.

Referring to the above-cited integrated circuit of the Texas Instruments Co. marketed under the code 74H40, the value of R (FIG. 7) for such circuit is approximately 60 ohms. A typical value of the characteristic impedance for an electromagnetic delay line is 75 ohms. To match such characteristic impedance, suitable values for resistors $R_2$ and $R_3$ are respectively 100 and 390 ohms.

The prior description refers in general to pulse generators and oscillators using NAND gates. However, the same result may be obtained by using NOR gates and a control signal of inverted binary value with respect to that of the cited examples. Consequently, the output pulses and the square waves will also have inverted levels, as may be verified by simple boolean algebra calculations.

FIG. 8 schematically illustrates a pulse generator circuit according to the invention and using NOR gates. It comprises a first NOR gate 12 having at least two inputs, a second NOR gate 13, also having at least two inputs; an electromagnetic delay line 14 and a matching impedance 15 for the delay line. The connections between different components are the same as described for a pulse generator using NAND gates. However, the input 17 of NOR gate 12 is connected to a voltage source corresponding to a ZERO binary level, such as for instance 0 volts, and the control signal applied to the terminal A, in the rest condition, corresponds to a binary level ONE, and in the operating condition, to a binary level ZERO.

Correspondingly, FIG. 9 illustrates the logic diagram of an oscillator using NOR gates. Likewise, in this case the connections are the same as those for an oscillator using NAND gates.

It may also be remarked that the connection between the input terminal 7 of NAND gate 2 of FIG. 3 and the delay line, as well as the connection between input terminal 17 of NOR gate 12 of FIG. 9 and the delay line, may be connected to an intermediate tap of the delay line instead of the end terminal, and that other changes may be made without therefore departing from the spirit and scope of the invention.

What is claimed is:

1. A circuit for generating at least one square pulse at a time in response to a command signal, comprising, in combination:

an integrated circuital unit comprising at least a first and a second gate means, each said gate means being provided with at least a first and a second input lead and an output lead;

an electromagnetic delay line having an input terminal connected to the output lead of said first gate means and at least an output terminal connected to a first input lead of said second gate means;

impedance matching means connected to an output terminal of said delay line;

an input terminal for receiving a command signal, connected to a first input lead of said first gate means and to a second input lead of said second gate means; and means for connecting said second input lead of said first gate means to a voltage source.

2. The circuit of claim 1, wherein said gate means are NAND gates.

3. The circuit of claim 1, wherein said gate means are NOR gates.

4. The circuit of claim 1, comprising, in addition, a third gate means, the output lead of said third gate means being connected to said first input lead of said first gate means, a first input lead of said third gate means being connected to an additional input terminal for receiving a command signal, and a second input lead of said third gate means being connected to the output lead of said second gate means.

5. The circuit of claim 1, wherein said voltage source comprises a suitable external voltage source, whereby said circuit will generate a single square pulse in response to said command signal.

6. The circuit of claim 1, wherein said voltage source comprises a suitable output terminal of said delay line, whereby said circuit will generate a succession of square pulses in response to said command signal.

* * * * *